US011667554B2

(12) United States Patent
McFadden

(10) Patent No.: US 11,667,554 B2
(45) Date of Patent: *Jun. 6, 2023

(54) WASTEWATER TREATMENT APPARATUS AND PROCESS THEREFOR

(71) Applicant: McFadden Engineering, Inc., Mobile, AL (US)

(72) Inventor: A. Frank McFadden, Mobile, AL (US)

(73) Assignee: McFadden Engineering, Inc., Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,633

(22) Filed: Apr. 12, 2022

(65) Prior Publication Data

US 2022/0242762 A1   Aug. 4, 2022

Related U.S. Application Data

(63) Continuation of application No. 14/211,543, filed on Mar. 14, 2014, now Pat. No. 11,325,852.

(60) Provisional application No. 61/852,031, filed on Mar. 15, 2013.

(51) Int. Cl.
  *C02F 3/10* (2023.01)
  *C02F 3/20* (2023.01)
  *C02F 103/44* (2006.01)

(52) U.S. Cl.
  CPC .......... *C02F 3/101* (2013.01); *C02F 3/20* (2013.01); *C02F 2103/44* (2013.01); *C02F 2203/006* (2013.01); *C02F 2203/008* (2013.01); *C02F 2301/02* (2013.01); *Y02W 10/10* (2015.05)

(58) Field of Classification Search
  CPC .... C02F 9/00; C02F 1/78; C02F 3/108; C02F 3/208; C02F 3/2806; C02F 3/2866; C02F 3/30; C02F 2001/007; C02F 2103/06; C02F 2303/16
  USPC ......................................................... 210/605
  See application file for complete search history.

(56) References Cited

U.S. PATENT DOCUMENTS

| 7,465,394 | B2 * | 12/2008 | Durda | ..................... C02F 3/207 210/194 |
| 7,544,286 | B2 * | 6/2009 | Tharp | ....................... C02F 3/30 210/150 |
| 2008/0245731 | A1 * | 10/2008 | Monosov | ................ C02F 3/103 210/615 |

FOREIGN PATENT DOCUMENTS

CN          101314511 A   * 12/2008

OTHER PUBLICATIONS

Cui et al, CN 101314511, English machine translation, pp. 1-6 (Year: 2008).*

* cited by examiner

*Primary Examiner* — Claire A Norris
(74) *Attorney, Agent, or Firm* — Breiner & Breiner, L.L.C.

(57) ABSTRACT

Wastewater treatment plants and processes for treating wastewater are described. The wastewater treatment plant utilizes channel plug flow dynamics with attached growth media and pure oxygen or mixtures of pure oxygen and compressed air.

29 Claims, 3 Drawing Sheets

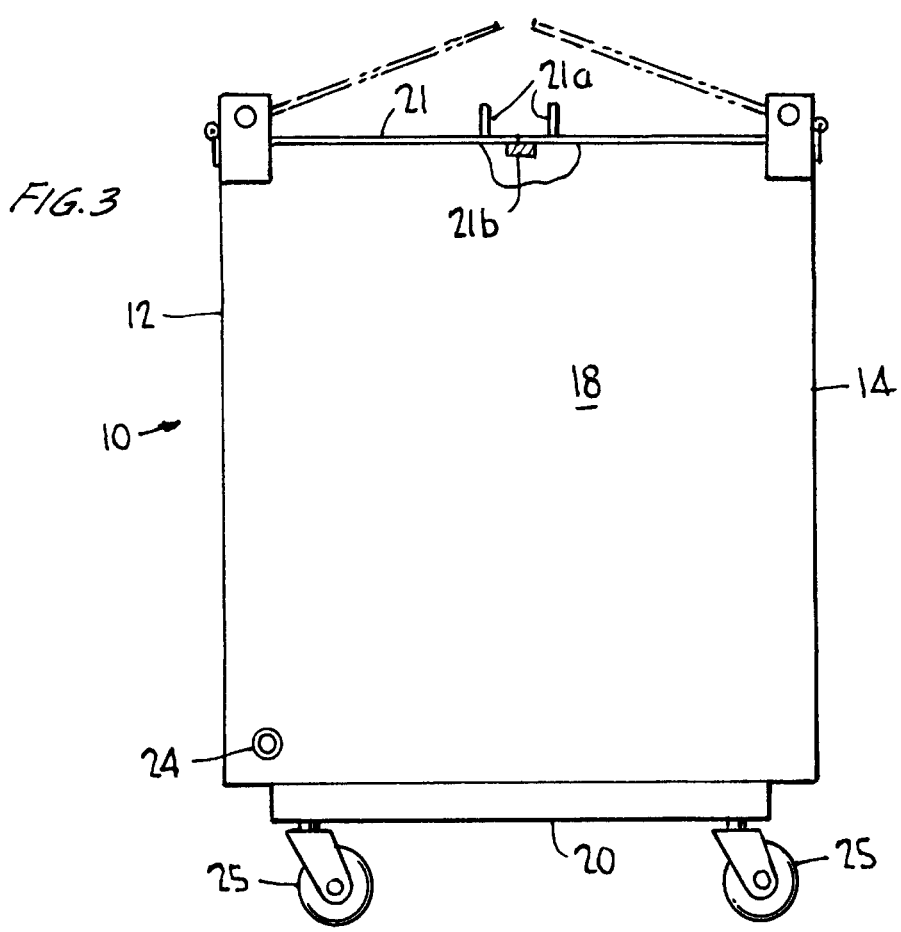
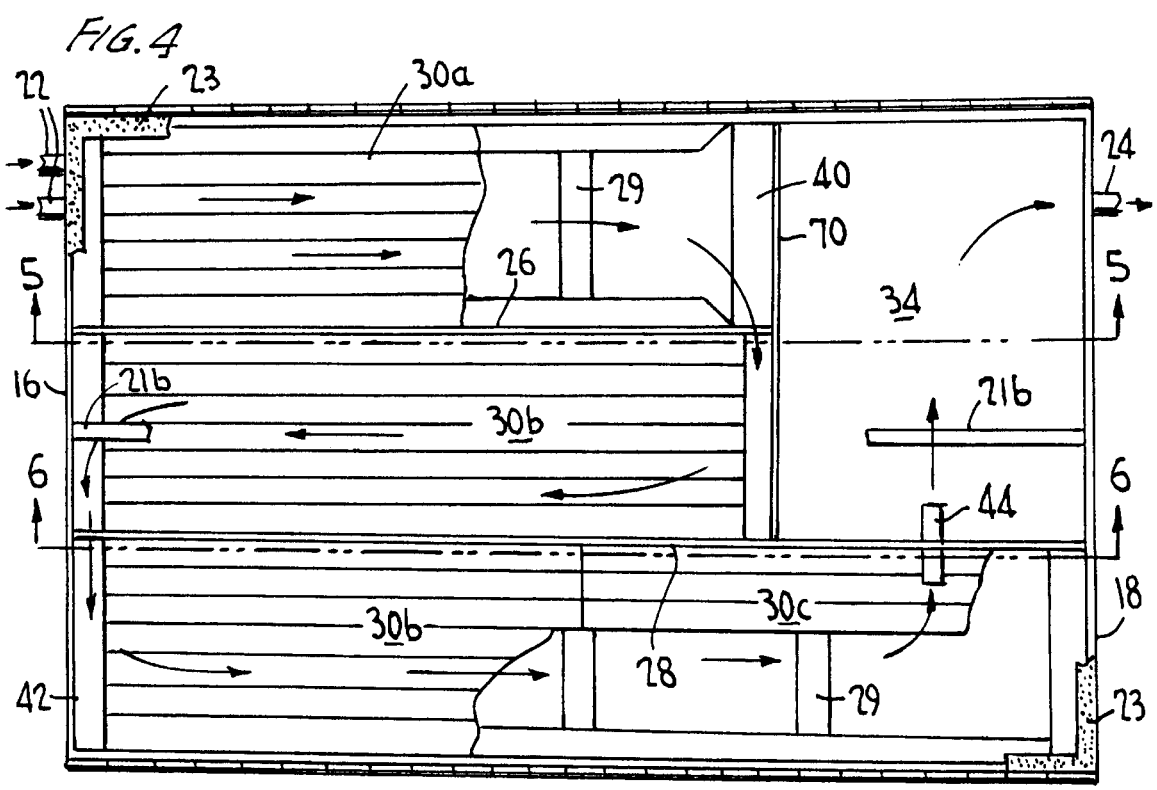

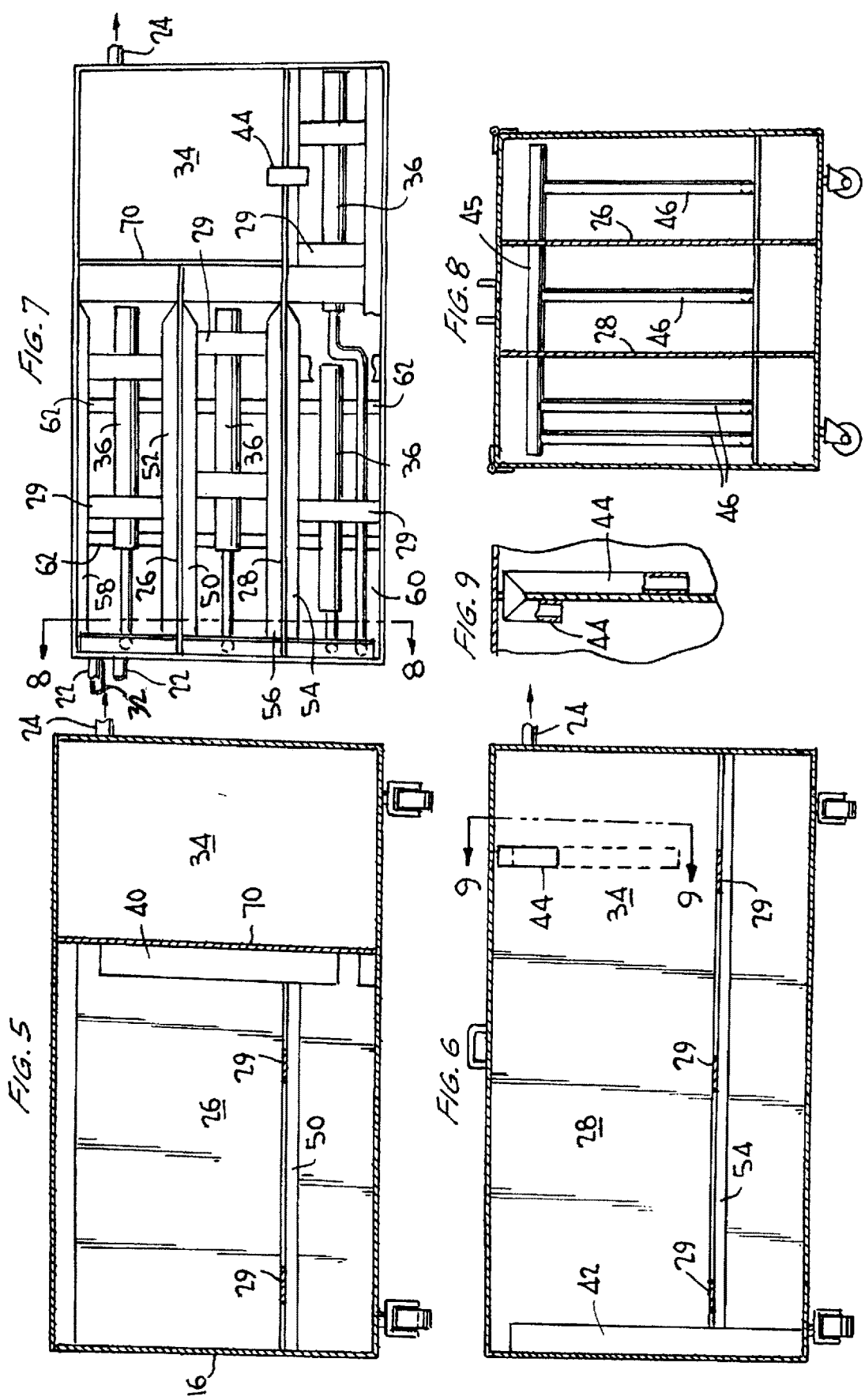

WASTEWATER TREATMENT APPARATUS AND PROCESS THEREFOR

RELATED APPLICATION

This application claims benefit of U.S. patent application Ser. No. 14/211,543, filed Mar. 14, 2014, entitled "Wastewater Treatment Apparatus And Process Therefor," which claims benefit of U.S. Provisional Application Ser. No. 61/852,031, filed Mar. 15, 2013, entitled "Wastewater Treatment Apparatus And Process Therefor," which applications are incorporated herein by reference in their entireties.

FIELD OF THE INVENTION

The present invention is directed to wastewater treatment plants and a new and unique apparatus and process for treating wastewater. More particularly, one preferred embodiment of the invention is directed to wastewater treatment utilizing channel plug flow dynamics with attached growth media and pure oxygen or mixtures of pure oxygen and compressed air.

BACKGROUND OF THE INVENTION

Biological wastewater treatment in the modern era has been accomplished by the cultivation of beneficial microorganisms being "grown" in a vessel, e.g. a tank, pond, lagoon (pond with mechanical mixers), etc., where the wastewater, such as domestic sewage, industrial wastewater, commercial wastewater, etc., can be introduced as a "food source" for the microbes. The microbes reduce the waste, i.e. the pollutants, resulting in an acceptable treated effluent, i.e. discharge water, which can be discharged to streams, rivers, bays, groundwater, or reuse applications such as landscape features, carwash water, irrigation, etc. The technology for this type of treatment has evolved exponentially in recent years due to the advancement of scientific and engineering understanding, more stringent environmental regulations, and economic advantages in the manufacturing sector. Perhaps most important in today's environment, there is a need to advance the usage of reclaimed water to offset a diminishing domestic water supply.

Early in the development of biological wastewater treatment, a simple pond or lagoon was utilized as a treatment process. Wastewater was contained after collection from, for example, a sewer network within a community, in the pond/lagoon where it was retained for several weeks. There, the inherent microbes would have a chance to reduce the waste allowing "treated" water to be discharged into a water body.

Later, in an effort to accelerate the process and provide a much smaller footprint for wastewater treatment plants (WWTPs), mechanical systems were developed to provide the necessary air and microbe manipulation to simulate what the sewer lagoons were doing in past years, only much faster and with a much smaller footprint. An advantage of these systems was the higher level of treatment provided and, therefore, a broader possibility of discharge locations. These systems were termed "activated sludge" treatment plants due to the microbes being "activated" by a high level of nutrients and carbon supplied by the wastewater thus allowing accelerated growth of the organisms resulting in a very high percentage of waste material removal. "Sludge" in this context is a coalescing of the microbes and not the waste itself. Treatment plants of this type could routinely remove 90-95% of the pollutants, i.e. organic matter, in the wastewater.

In approximately the last decade, modification of the activated sludge process has added another highly efficient method of removing the organic matter from wastewater utilizing the "attached growth process" in lieu of a suspended growth process. Thus, in the conventional activated sludge systems, the microbes and wastewater were mixed together in the vessel/tank, sometimes referred to as a reactor, along with aeration devices such as diffusers, mixers, etc., that would keep the water completely mixed allowing sufficient contact time for the microbes to do their job. The development of attached growth media systems supplemented the suspended growth process by the addition of "media" of some sort, such as polyethylene extruded polymer, similar to a plastic honeycomb, placed into the reactor to allow the microbes to attach themselves and grow rather than being suspended in the mixed water. This media has a high surface area to volume ratio allowing a lot of surface for the microbes to grow in a small volume of space. This has proven to be a good system for some applications.

While known WWTPs have been useful, there is a need for WWTPs for treating small flow, e.g. 100,000 gallons per day or less, and more preferably 50,000 gallons per day, having a small foot print and which is efficient in removing pollutants.

SUMMARY OF THE INVENTION

The invention is directed to a new apparatus and method using variations of the plug flow process, the attached growth media process and subjecting the wastewater to nearly pure oxygen (>90%) vs. air (19% $O_2$) or mixtures of pure oxygen and compressed air as discussed hereafter. Thus, the invention is a WWTP that uses continuous "channel" plug flow dynamics with attached growth media and pure oxygen as a source of required oxygen, or a combination of pure oxygen and compressed air.

Objects of the invention include, but are not limited to, the following: (a) a reduction in the retention time within the reactor by utilizing oxygen, thus a smaller footprint and smaller basin per gallon for treatment; (b) minimization of "washout" as with complete mix systems; (c) higher microbial populations, thus higher treatment efficiency; (d) higher reduction in recalcitrant organic compounds due to higher oxygen concentrations in the mixed liquor; (e) reduction of short-circuiting in the flow path as with complete mix systems; and (f) a more cost effective system in terms of space and usage. Places with smaller plots where space is at a premium, e.g. restaurants, carwashes, etc., will find the invention a more viable option than the known treatment processes. Additionally, offshore operations such as oil platforms and marine vessels will find the invention very useful given available space restrictions and the required effluent quality.

The present invention includes an apparatus for treatment of wastewater comprising a wastewater treatment tank for treating an influent wastewater and providing treated effluent discharge water. The tank may comprise a tank having a bottom wall, side walls, a first end wall, a second end wall and a cover providing access to the inside of the tank. The first end wall includes a means for receiving influent wastewater and the second end wall includes a means for discharging effluent treated discharge water. There are at least two baffles providing for at least three separate compartments in the tank adapted to provide for plug flow movement of the wastewater. The compartments may include attached growth media for treating the wastewater. There is an oxygen source or an oxygen and compressed air source connected to an air diffuser in each of the compartments for treating the water. The influent wastewater enters the tank through the first end wall and flows through the at least three compartments utilizing plug flow movement and is treated by the attached growth media and the oxygen or oxygen and compressed air to provide a treated effluent discharge water which exits the tank through the second end wall.

The present invention further includes a method of treating wastewater comprising pumping wastewater into a wastewater treatment tank. The wastewater treatment tank comprises at least two baffles providing for at least three separate compartments in the tank adapted to provide for plug flow movement of the wastewater. The compartments may include attached growth media for treating the wastewater. There is an oxygen source or an oxygen and compressed air source connected to an air diffuser in each of the compartments for treating the water. The influent wastewater enters the tank and flows through the at least three compartments utilizing plug flow movement and is treated by the attached growth media and the oxygen or oxygen and compressed air to provide a treated effluent discharge water which exits the tank.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 3 is an end view of the effluent end of the apparatus of FIG. 1.

FIG. 4 is a top view of the apparatus of FIG. 1 showing the inside of the apparatus with the growth media partially cut away in the first and third compartments and showing the wastewater flow (certain of the other components of the tank are not shown for ease of reference).

FIG. 5 is taken along line 5-5 of FIG. 4 showing an elevational view of a first baffle and an additional area for filtration or treatment of the treated water.

FIG. 6 is taken along line 6-6 of FIG. 4 showing an elevational view of a second baffle.

FIG. 7 is a top view of the apparatus of FIG. 1 with the growth media removed and showing the diffuser components of the tank.

FIG. 8 is taken along line 8-8 of FIG. 7 and shows an elevational view of the influent end of the tank of FIG. 1 showing the piping attached to the diffusers.

FIG. 9 is taken along line 9-9 of FIG. 6 and is a partial elevational view showing the outlet pipe.

DETAILED DESCRIPTION OF THE INVENTION

Figure 1:
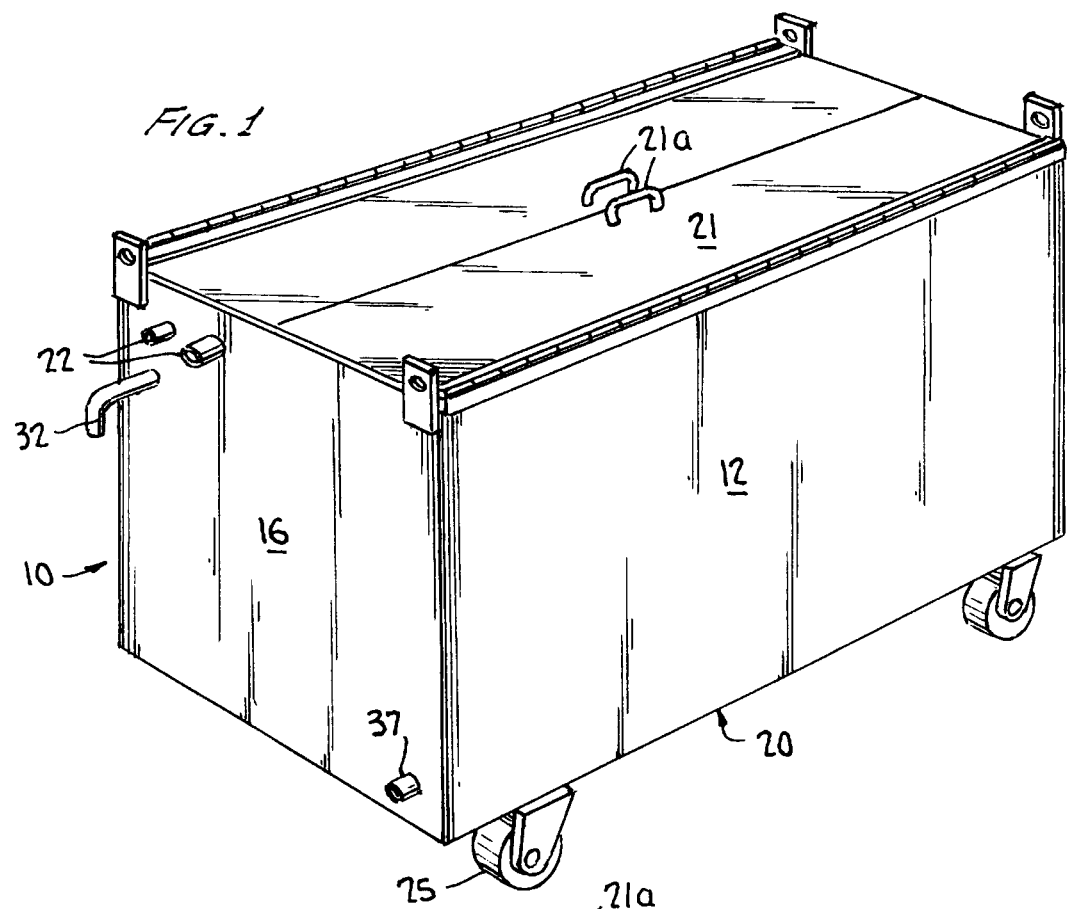
FIG. 1 is a perspective view of the apparatus of the present invention.

The present invention is directed to the treatment of wastewater from various sources. The size and scale of the present invention will vary depending upon the amount of wastewater to be treated and the nature of the wastewater being treated. The present invention is useful for the treatment of wastewater from carwash facilities. The description of the present invention will be directed to a wastewater treatment plant for treatment of wastewater from carwash facilities. However, it is understood that the invention may be directed to a number of other wastewater treatment facilities, including as described in this application.

The wastewater treatment plant of the present invention includes a tank 10. The tank includes side walls 12 and 14, end walls 16 and 18, a bottom 20, and a top 21. The top 21 includes a handles 21a for opening the top via hinges as seen in FIG. 3 and there is a center support rail 21b for the top members 21. It is understood that the top remains closed in operation, and there is a gasket 23 (only partially shown in FIG. 4), preferably made of foam, surrounding the upper ends of the side and end walls to maintain the oxygen or oxygen and compressed air in the system. A preferred dimension for a WWTP 10 for treatment of wastewater from a carwash averaging about 3,000 gallons per day is approximately 6 feet in length, 3 feet in width and 4 feet in height, although these dimensions may vary without departing from the scope of the invention. The tank may include casters 25 and may be movable.

The tank 10 receives the wastewater from a carwash and provides for the treatment of the wastewater. The tank includes influent openings 22 in end wall 16 for receiving the wastewater and an effluent opening 24 in the end wall 18 for discharging the treated wastewater, i.e. pollutant-reduced water. The invention uses a plug flow process providing for a continuous path for the movement and the treatment of the wastewater as shown, for example, in FIG. 4. The tank is divided by baffles 26 and 28 providing for separate compartments and a serpentine path for the continuous flow of the wastewater, i.e. plug flow movement of the wastewater. While a presently preferred embodiment includes two baffles 26 and 28, a different number of baffles may be used without departing from the scope of the invention.

More specifically, referring to FIGS. 5 and 6 the baffles 26 and 28 will be described. FIG. 5 shows baffle 26 which extends vertically from the bottom 20 of tank 10 and includes an opening 40 for the water flow from the first compartment of the tank to the second compartment of the tank. Baffle 26 includes baffle extension members 50 and 52 which extend from end wall 16 to the wall 70 of compartment 34 and provide reinforcement for the tank sides. Additionally, baffle 26 includes support plates 29 which provides support for the growth media 30. Such support plates 29 are in each compartment as shown in FIG. 7.

Referring now to FIG. 6, baffle 28 is described. Like baffle 26, baffle 28 extends from the bottom 20 of the tank vertically close to the top portion of the tank. Baffle 28 includes opening 42 for the water flow. Like baffle 26, there are baffle extensions 54 and 56 which provide support to the side walls. It is further noted that the side walls 12 and 14 also include similar extension members 58 and 60 providing means for attachment of plates 29 for support of growth media 30 and structural support for tank 10. Similar to baffle 26, there are also support plates 29 attached thereto and extending to the extension members in the side walls of the tank.

Referring now to FIG. 7, there is shown diffuser members 36. Diffuser members 36 are held on support plates 62. In a preferred embodiment, EDI FlexAir™ "T" Series fine bubble tube diffusers 36 are used, manufactured by Environmental Dynamics Inc., Columbia Mo., although other brand diffusers are useful for air/O2 diffusion and mixing provided the specifications are met. The diffuser members are connected to air supply members 46. Referring to FIGS. 1 and 7, the wastewater treatment plant may utilize pure oxygen fed from an oxygen generator (not shown) to input source 32 as the source of oxygen for the aerobic bacteria and other organisms in the oxidation of organic chemicals in various sources of wastewater. In the alternative, the plant may utilize pure oxygen and compressed air, the compressed air and pure oxygen being regulated in the specific amounts depending upon the wastewater being treated. The oxygen and compressed air is fed to a manifold 45 and distributed by pipes 46, preferably made of PVC, to diffusers 36. Diffusers 36 provide fine bubbles to accelerate the growth of the microbes for treating the wastewater.

Referring to FIG. 4, the tank includes attached growth media 30a, 30b and 30c for the treatment of the wastewater (media 30a and 30c being shown partially cut away). As stated above, the tank includes an input source 32 for introducing oxygen into the system for promoting the growth of organisms on the growth media 30 for treating the wastewater and removing pollutants from the wastewater. A presently preferred growth media is a polymer extrusion media made by Matala Water Technology of Taiwan. However, other manufacturers growth media may be used with the understanding that the proper surface to volume ratio and compatibility with wastewater specifications are met. The first approximately ⅓ of the flow length will contain the polymer media 30a with a minimum surface to volume ratio of about 88 $ft^2/ft^3$ followed by the next roughly ⅓ flow length containing polymer media 30b with a minimum surface to volume ratio of about 111 $ft^2/ft^3$. The final roughly ⅓ of flow length, where polishing occurs, may have a polymer media 30c having a minimum surface to volume ratio of about 140 $ft^2/ft^3$. The media density may be modified as needed for desired treatment results.

The hydraulic configuration of the tank is a continuous flow path, i.e. plug flow, with preferably a minimum length to width ratio through the reactor containing the media of about 8:1 depending on wastewater characteristics and composition. It is understood that this ratio may further be in the range of about 8:1 to about 12:1. The wastewater will flow through the reactor as a fixed film process utilizing a high surface area to volume media made from the growth media which will provide growth sites for the aerobic bacteria and other inherent organisms, or a bacteria "condominium" where they will grow and multiply thus reducing pollutants in the wastewater.

The tank includes an internal final compartment 34 where the reactor, i.e., aeration chambers or compartments, terminates to be used for installation of an additional filtration (e.g., ultra, nano, etc.) unit as needed. This compartment 34 is especially useful in meeting water reuse requirements, although it may be optional depending on required water quality. The final compartment can also be used for settling, disinfection, or chemical addition.

A preferred embodiment uses a tank constructed using 5/16 inch aluminum plate with welded joints and seams. Other materials may be utilized for the tank construction provided that the materials are compatible with the characteristics of the untreated wastewater and structurally capable of supporting the system components and weight of water, including aluminum, stainless steel, fiberglass, or any extruded polymer (e.g., plastic, high density polyethylene, etc.) The tank preferred preferably includes a member 37 to drain the water from all of the compartments.

Figure 2:
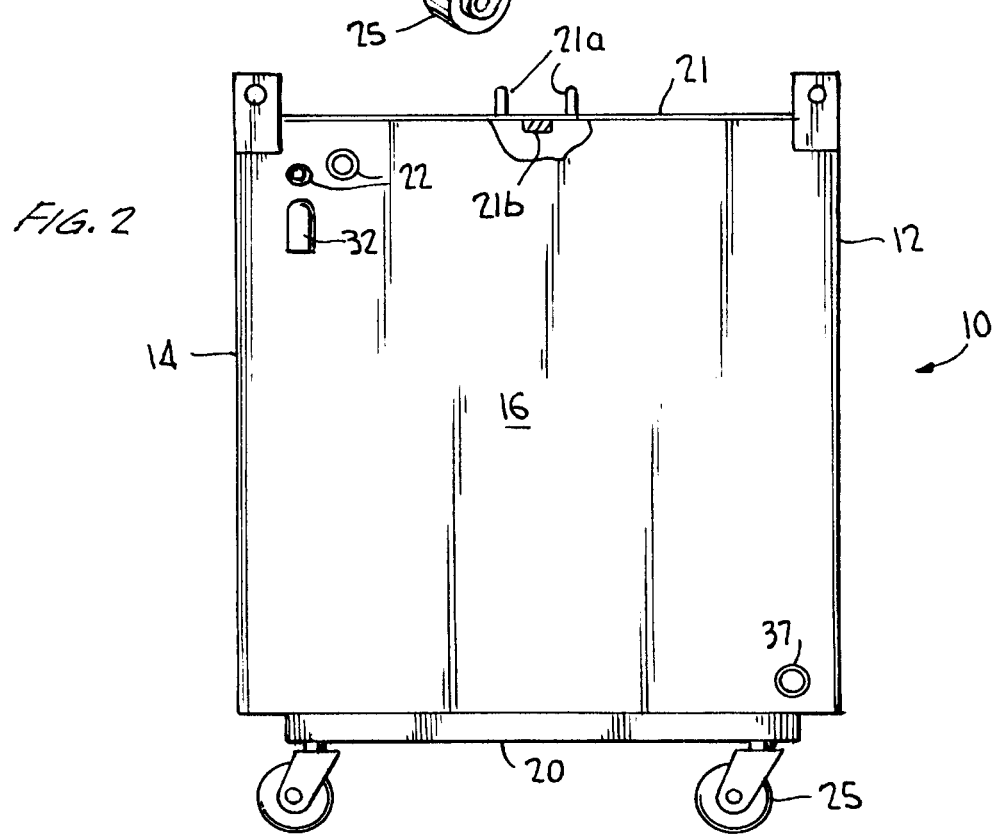
FIG. 2 is an end view of the influent end of the apparatus of FIG. 1.

The operation of the apparatus and method of the invention will now be described in relation to the drawings. Referring, for example, to FIG. 2, there are two inlet openings 22, e.g. a 1.75 inch diameter aluminum pipe fitting and a 1.25 inch diameter aluminum pipe fitting, for receiving the wastewater, in this example wastewater from a carwash using tank 10 as described above. The openings provide for receiving different size pump hoses. The wastewater from a carwash is pumped through one of openings 22 into tank 10, preferably in the range of about two gallons to about six gallons per minute. Referring to FIG. 4, the wastewater is approximately an inch above the growth media 30 and below baffles 26 and 28. As stated, the growth media is preferably of different densities, the least dense being in the first compartment and the most dense being in the third compartment prior to overflow into the filtration/chemical addition compartment 34. The water circulates from the first compartment through an opening 40 to the second compartment and circulates through the second compartment through an opening 42 to the third compartment. The circulation time may be in the range of about eight to 24 hours depending on the oxygen concentration utilized. Thereafter, the treated water is moved from the third compartment via overflow pipe 44, as shown in FIGS. 8 and 9, to the final compartment 34 for any additional treatment. Thereafter, the treated water is removed from the tank through effluent opening 24. In this example, the wastewater is treated with pure oxygen entering from an oxygen source through pipe 32 and fed to a manifold 45 which feeds conduits 46 to the fine bubble diffusers 36. This accelerates the growth of the microbes for treated the wastewater. It is understood that the rate of the oxygen feed may be varied thereby reducing or increasing the wastewater detention time in the tank. It is understood that instead of pure oxygen, a mixture of pure oxygen and compressed air may be used.

Accordingly, an objective of the present invention is a combination of nearly pure oxygen as an oxygen source or mixed as required with compressed ambient air with continuous plug flow hydraulics and attached growth media as the substrate for bacteria to attach and grow. This provides for a smaller footprint of the apparatus and process, thereby achieving lower costs, the ability to utilize the treated water in sustainable applications such as water reuse, and a more complete oxidation of pollutants. An additional advantage is the reduced waste sludge volume as found in conventional suspended growth complete mixed systems.

The invention may be used by entities requiring wastewater treatment with approximately less than 100,000 gallons per day of flow, and preferably about 50,000 gallons per day, including the carwash industry for treatment and/or reuse of wastewater from the facility, marine vessels and offshore oil platforms, remote land-based oil exploration sites, and any other commercial, industrial, and domestic applications requiring wastewater treatment.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A wastewater treatment tank utilizing a continuous channel plug flow process for treating an influent wastewater and providing treated effluent discharge water comprising:
a tank having a bottom wall, side walls, a first end wall, a second end wall and a cover providing access to the inside of said tank and adapted to enclose the wastewater treatment tank to keep nearly pure oxygen or a mixture of nearly pure oxygen and compressed air enclosed in the tank when in operation;
an influent opening in one of said walls for receiving influent wastewater;
an effluent opening in one of said walls for discharging said treated effluent discharge water;
at least two baffles providing for at least three separate compartments in said tank wherein there are vertical openings at opposite ends of said baffles and said vertical openings are substantially the entire height of said baffles;
said baffles and said vertical openings are adapted to provide for continuous plug flow movement of said wastewater through each of said at least three compartments wherein said plug flow movement of said wastewater comprises a serpentine path for continuous flow of said wastewater through said vertical openings at opposite ends of said at least two baffles;
an air diffuser adapted to diffuse nearly pure oxygen or a mixture of nearly pure oxygen and compressed air to each of said at least three compartments,
said at least three compartments including attached growth media in each compartment for treating said wastewater and constructed and arranged for said wastewater to cover said attached growth media; and
a source of nearly pure oxygen or a source of a mixture of nearly pure oxygen and compressed air connected to said air diffuser for treating said wastewater,
wherein influent wastewater enters said tank through said influent opening and flows through the at least three compartments with said continuous plug flow movement and is treated by said attached growth media and said nearly pure oxygen or said mixture of nearly pure oxygen and compressed air to provide said treated effluent discharge water which exits said tank through said effluent opening.

2. The wastewater treatment tank according to claim 1 further comprising an outlet pipe in the last treatment compartment exiting to a further treatment compartment.

3. The wastewater treatment tank according to claim 2 wherein said further treatment compartment comprises means for further treating said treated effluent discharge water selected from the group consisting of means for additional filtration, means for disinfection, means for settling and means for chemical addition.

4. The wastewater treatment tank according to claim 1 wherein said tank is adapted to treat 100,000 gallons of water per day or less.

5. The wastewater treatment tank according to claim 1 wherein said tank provides for a fully aerobic system.

6. The wastewater treatment tank according to claim 1 wherein said wastewater is treated with nearly pure oxygen.

7. The wastewater treatment tank according to claim 1 wherein said attached growth media in said at least three compartments are of at least two different densities and the density of said attached growth media of a first compartment is of a lesser density than the attached growth media of at least one of a subsequent compartment.

8. The wastewater treatment tank according to claim 7 wherein said attached growth media comprises a polymer media.

9. The wastewater treatment tank according to claim 8 wherein said attached growth media in said first compartment has a surface area to volume ratio in the range of about 88 ft2/ft3 to 110 ft2/ft3.

10. A method of treating wastewater utilizing a continuous channel plug flow process comprising:
pumping wastewater into a wastewater treatment tank wherein said tank is adapted to keep nearly pure oxygen or a mixture of nearly pure oxygen and compressed air enclosed in the tank when in operation;
said wastewater treatment tank comprising at least one baffle providing for at least two separate compartments in said tank wherein there is a vertical opening at one end of said baffle and said vertical opening is substantially the entire height of said baffle;
said baffle and said vertical opening is adapted to provide for continuous plug flow movement of said wastewater through each of said at least two compartments wherein said plug flow movement of said wastewater comprises a serpentine path for continuous flow of said wastewater through said vertical opening at an end of said at least one baffle opposite from an influent opening;
an air diffuser adapted to diffuse nearly pure oxygen or a mixture of nearly pure oxygen and compressed air to each of said at least two compartments,
said at least two compartments including attached growth media in each compartment for treating said wastewater and constructed and arranged for said wastewater to cover said attached growth media; and
a source of nearly pure oxygen or a source of a mixture of nearly pure oxygen and compressed air connected to said air diffuser for treating said wastewater;
wherein influent wastewater enters said tank and flows through the at least two compartments with said continuous plug flow movement and is treated by said attached growth media and said nearly pure oxygen or said mixture of nearly pure oxygen and compressed air to provide treated effluent discharge water which exits said tank.

11. The method according to claim 10 wherein said wastewater is treated with nearly pure oxygen.

12. The method of claim 10 wherein said attached growth media in said at least two compartments are of different densities and the density of said attached growth media of a first compartment is of a lesser density than the attached growth media of at least a subsequent compartment.

13. The method according to claim 12 wherein said attached growth media comprises a polymer media.

14. The method according to claim 13 wherein said attached growth media in said first compartment has a surface area to volume ratio in the range of about 88 ft2/ft3 to 110 ft2/ft3.

15. The method according to claim 10 wherein said plug flow movement comprises a length to width ratio through the tank of about 8:1 to about 12:1.

16. A wastewater treatment tank utilizing a continuous channel plug flow process for treating an influent wastewater and providing treated effluent discharge water comprising:
a tank having a bottom wall, side walls, a first end wall, a second end wall and a cover providing access to the inside of said tank and adapted to enclose the wastewater treatment tank to keep nearly pure oxygen or a mixture of nearly pure oxygen and compressed air enclosed in the tank when in operation;

an influent opening in one of said walls for receiving influent wastewater;

an effluent opening in one of said walls for discharging said treated effluent discharge water;

at least one baffle providing for at least two separate compartments in said tank wherein there is a vertical opening at one end of said baffle and said vertical opening is substantially the entire height of said baffle;

said baffle and said vertical opening are adapted to provide for continuous plug flow movement of said wastewater through said at least two separate compartments wherein said plug flow movement of said wastewater comprises a serpentine path for continuous flow of said wastewater through said vertical opening at an end of said at least one baffle opposite from the influent opening;

an air diffuser adapted to diffuse nearly pure oxygen or a mixture of nearly pure oxygen and compressed air to each of said at least two compartments, said at least two compartments including attached growth media in each compartment for treating said wastewater and constructed and arranged for said wastewater to cover said attached growth media; and a source of nearly pure oxygen or a source of a mixture of nearly pure oxygen and compressed air connected to said air diffuser for treating said wastewater, wherein influent wastewater enters said tank through said influent opening and flows through the at least two compartments with said continuous plug flow movement and is treated by said attached growth media and said nearly pure oxygen or said mixture of nearly pure oxygen and compressed air to provide said treated effluent discharge water which exits said tank through said effluent opening.

17. The wastewater treatment tank according to claim 16 wherein said tank is adapted to treat 100,000 gallons of water per day or less.

18. The wastewater treatment tank according to claim 16 wherein said attached growth media in said at least two compartments are of at least two different densities and the density of said attached growth media of a first compartment is of a lesser density than the attached growth media of at least one of a subsequent compartment.

19. The wastewater treatment tank according to claim 18 wherein said attached growth media comprises a polymer media.

20. The wastewater treatment tank according to claim 19 wherein said attached growth media in said first compartment has a minimum surface area to volume ratio of about 88 ft2/ft3.

21. The wastewater treatment tank according to claim 16 wherein said wastewater is treated with nearly pure oxygen.

22. The wastewater treatment tank according to claim 16 wherein said plug flow movement comprises a length to width ratio through the tank of about 8:1 to about 12:1.

23. A wastewater treatment system utilizing a continuous channel plug flow process for treating an influent wastewater and providing treated effluent discharge water comprising:

an enclosed tank adapted to keep nearly pure oxygen or a mixture of nearly pure oxygen and compressed air enclosed in the tank when in operation;

an influent opening in a wall of said tank for receiving influent wastewater;

an effluent opening in a wall of said tank for discharging said treated effluent discharge water;

at least one baffle providing for at least two separate compartments in said tank wherein there is a vertical opening at one end of said baffle and said vertical opening is substantially the entire height of said baffle;

said baffle and said vertical opening are adapted to provide for continuous plug flow movement of said wastewater through each of said at least two compartments wherein said plug flow movement of said wastewater comprises a serpentine path for continuous flow of said wastewater;

an air diffuser adapted to diffuse nearly pure oxygen or a mixture of nearly pure oxygen and compressed air to each of said at least two compartments, said at least two compartments including attached growth media in each compartment for treating said wastewater and constructed and arranged for said wastewater to cover said attached growth media; and a source of nearly pure oxygen or a source of a mixture of nearly pure oxygen and compressed air connected to said air diffuser for treating said wastewater, wherein influent wastewater enters said tank through said influent opening and flows through the at least two compartments with said continuous plug flow movement and is treated by said attached growth media and said nearly pure oxygen or said mixture of nearly pure oxygen and compressed air in said fully aerobic system to provide said treated effluent discharge water which exits said tank through said effluent opening.

24. The wastewater treatment tank according to claim 23 wherein said wastewater is treated with nearly pure oxygen.

25. The wastewater treatment tank according to claim 23 wherein said attached growth media in said at least two compartments are of at least two different densities and the density of said attached growth media of a first compartment is of a lesser density than the attached growth media of at least one of a subsequent compartment.

26. The wastewater treatment tank according to claim 25 wherein said attached growth media comprises a polymer media.

27. The wastewater treatment tank according to claim 26 wherein said attached growth media in said first compartment has a minimum surface area to volume ratio of about 88 ft2/ft3.

28. The wastewater treatment tank according to claim 23 wherein said tank is adapted to treat 100,000 gallons of water per day or less.

29. The wastewater treatment tank according to claim 23 wherein said plug flow movement comprises a length to width ratio through the tank of about 8:1 to about 12:1.

* * * * *